(12) United States Patent
Chen

(10) Patent No.: US 7,889,126 B2
(45) Date of Patent: Feb. 15, 2011

(54) TRACKING METHOD

(75) Inventor: Chi-Ting Chen, Taipei Hsien (TW)

(73) Assignee: Wintecronics Ltd. (TW)

( * ) Notice: Subject to any disclaimer, the term of this patent is extended or adjusted under 35 U.S.C. 154(b) by 257 days.

(21) Appl. No.: 12/257,979

(22) Filed: Oct. 24, 2008

(65) Prior Publication Data

US 2009/0315765 A1    Dec. 24, 2009

(30) Foreign Application Priority Data

Jun. 23, 2008    (TW) .................................. 97123316

(51) Int. Cl.
*G01S 19/42* (2010.01)
*G01S 19/31* (2010.01)

(52) U.S. Cl. .............................. 342/357.71; 342/357.25

(58) Field of Classification Search ............ 342/357.06, 342/357.07, 357.09, 357.13, 457, 357.25, 342/357.31, 357.63, 357.64, 357.71; 701/213, 701/215; 455/456.1, 457
See application file for complete search history.

(56) References Cited

U.S. PATENT DOCUMENTS

2008/0086356 A1*    4/2008    Glassman et al. ............. 705/10

\* cited by examiner

*Primary Examiner*—Dao L Phan
(74) *Attorney, Agent, or Firm*—Choate, Hall & Stewart, LLP

(57) ABSTRACT

A tracking method includes enabling a target device to obtain a location information thereof, and enabling the target device to generate a uniform resource locator (URL), which contains the location information obtained thereby and a location of an electronic map-containing webpage of a website. The electronic map-containing webpage contains an electronic map, and an indication of a location of the target device on the electronic map.

9 Claims, 7 Drawing Sheets tracking method

CROSS-REFERENCE TO RELATED
APPLICATION

This application claims priority of Taiwanese application no. 097123316, filed on Jun. 23, 2008.

BACKGROUND OF THE INVENTION

1. Field of the Invention

This invention relates to a tracking method, more particularly to a tracking method that utilizes a global positioning system (GPS).

2. Description of the Related Art

A conventional tracking system for tracking a person or an object, such as a car, includes a target device and a tracking device. The target device is operable so as to obtain a latitude and a longitude thereof (e.g., 23.7788, N, 120.5566, E) from a global positioning system (GPS) service provider and so as to send the latitude and longitude obtained thereby to the tracking device via a short messaging service (SMS). The tracking device includes a geographic information system (GIS) module, and is operable so as to display an electronic map, which is retrieved thereby from a database of the GIS module thereof and which corresponds to the latitude and longitude sent thereto by the target device, and so as to indicate a location of the target device on the electronic map with reference to the latitude and longitude sent thereto by the target device.

The aforementioned conventional tracking system is disadvantageous in that the tracking device thereof includes the GIS module, and therefore requires the tracking device to be either a desktop computer or a notebook computer, which is bulky, or a smart phone or a personal digital assistant (PDA), which is expensive.

SUMMARY OF THE INVENTION

Therefore, an object of the present invention is to provide a tracking method that can overcome the aforesaid drawback of the prior art.

According to an embodiment of the present invention, a tracking method comprises enabling a target device to obtain a location information thereof, and enabling the target device to generate a uniform resource locator (URL), which contains the location information obtained thereby and a location of an electronic map-containing webpage of a website.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
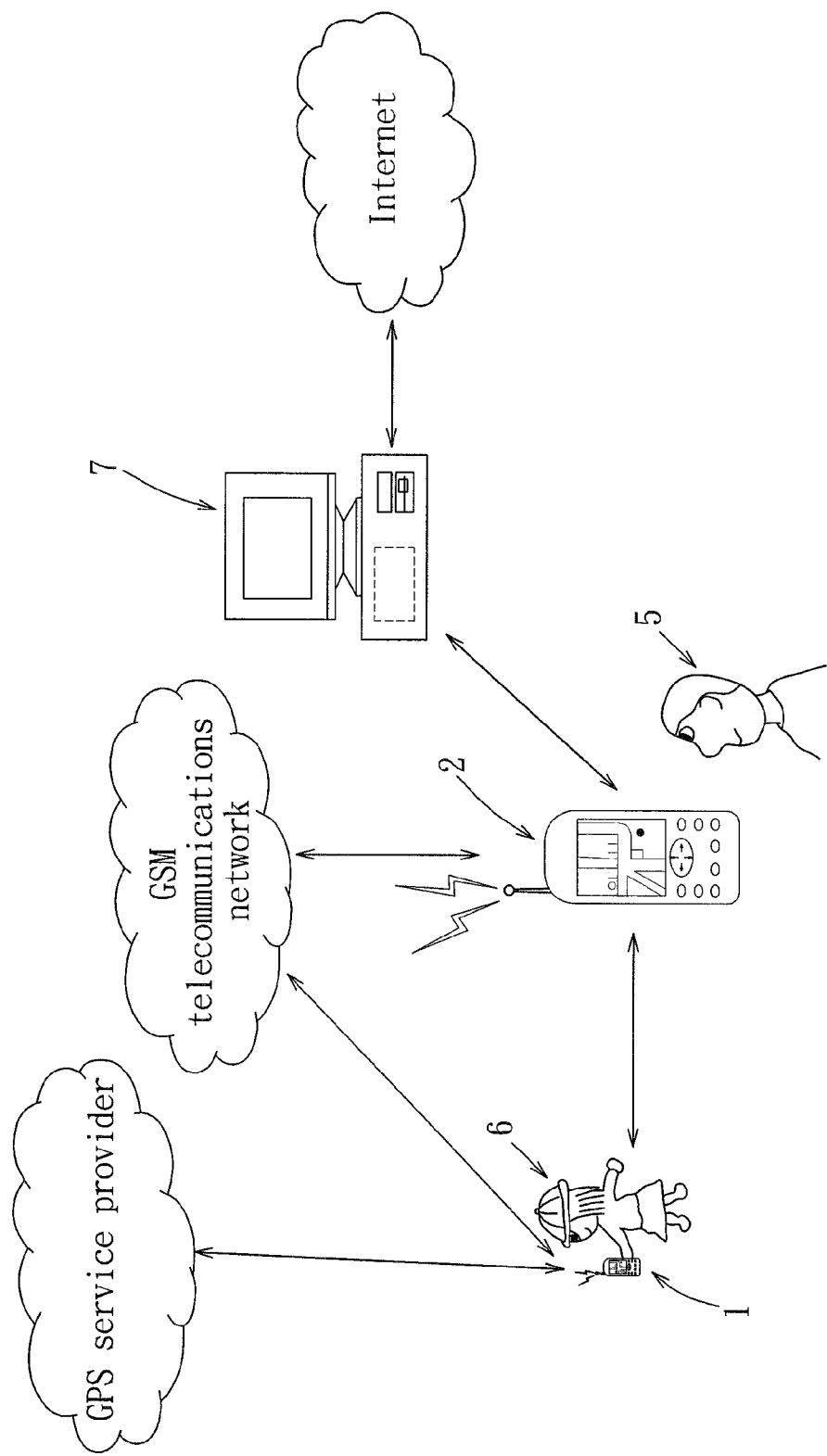
FIG. 1 is a schematic diagram of the first embodiment of a tracking system.

Before embodiments of the present invention are described in greater detail, it should be noted that like elements are denoted by the same reference numerals throughout the disclosure.

Figure 2:
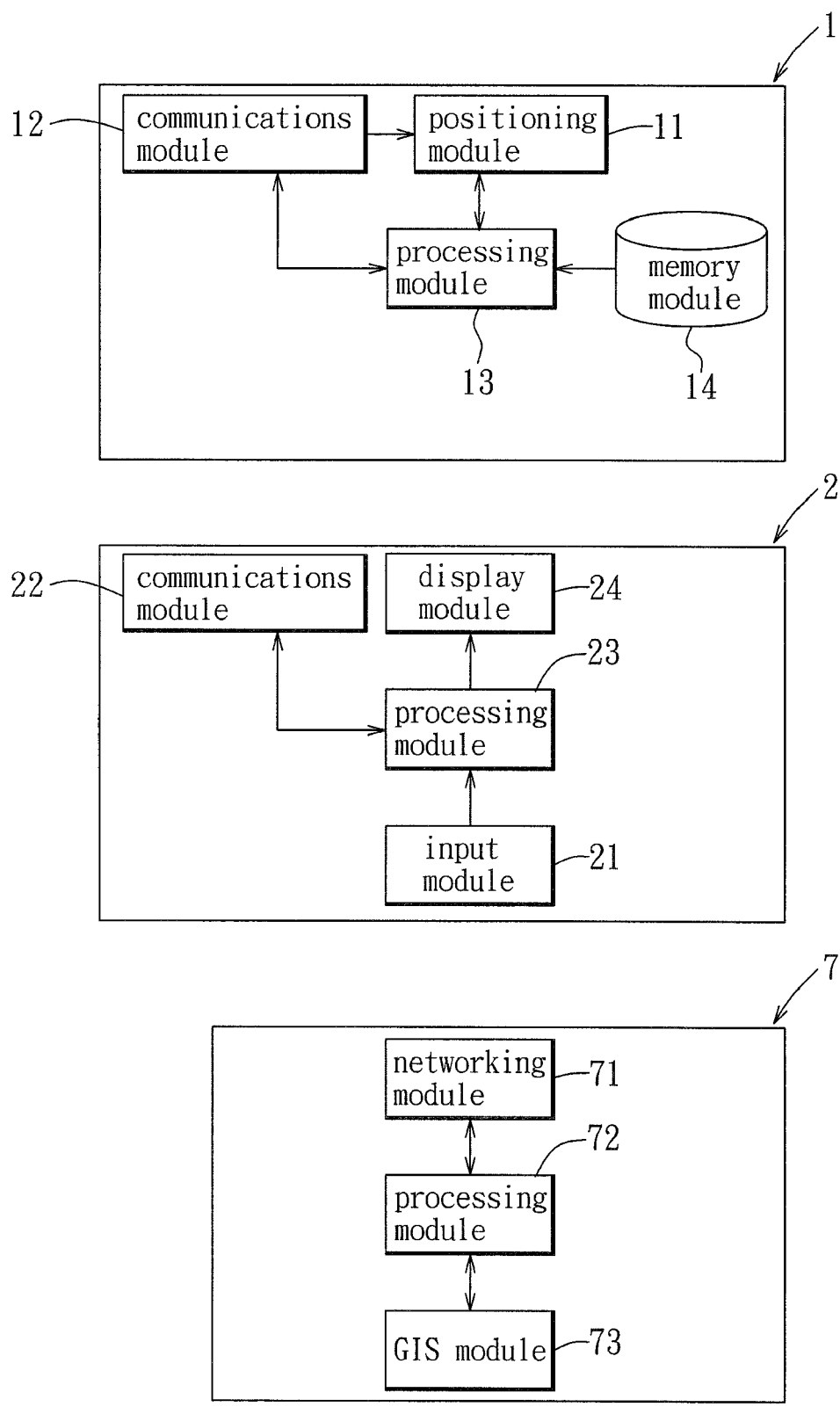
FIG. 2 is a block diagram of each of a target device, a tracking device, and a server of the first embodiment.

Referring to FIGS. 1 and 2, the first embodiment of a tracking system according to this invention is shown to include a target device 1, a tracking device 2, and a server 7. The tracking system of this invention is applied to track a location of a person 6 or an object (not shown), such as a car, by another person 5, in a manner that will be described hereinafter.

The target device 1 includes a processing module 13, a positioning module 11, a memory module 14, and a communications module 12. In this embodiment, the target device 1 is a portable electronic device, such as a mobile phone or a personal digital assistant (PDA).

The positioning module 11 of the target device 1 is connected to the processing module 13 of the target device 1 and is operable so as to obtain location information of the target device 1. In this embodiment, the positioning module 11 of the target device 1 obtains the location information of the target device 1 from a global positioning system (GPS) service provider. Moreover, in this embodiment, the location information includes a latitude, a longitude, a speed, a direction, an orientation of the target device 1, and date and time at which the location information is obtained by the positioning module 11 of the target device 1.

The memory module 14 of the target device 1 is connected to the processing module 13 of the target device 1, and stores a program instruction, which when executed by the processing module 13 of the target device 1 causes the target device 1 to generate a uniform resource locator (URL) that contains the location information of the target device 1 obtained by the positioning module 11 of the target device 1 and a location of an electronic map-containing webpage of a website. In this embodiment, the target device 1 generates the URL as a hyperlink.

The communications module 12 of the target device 1 is connected to the processing module 13 of the target device 1 and a global system for mobile communications (GSM) telecommunications network, and is operable so as to send the URL generated by the target device 1 to the tracking device 2 through the GSM telecommunications network. In this embodiment, the communications module 12 of the target device 1 sends the URL to the tracking device 2 via a short messaging service (SMS) of the GSM telecommunications network.

In another embodiment, the communications module 12 of the target device 1 sends the URL to the tracking device 2 via a multimedia messaging service (MMS) or an electronic mail (e-mail).

The tracking device 2 includes a processing module 23, an input module 21, a communications module 22, and a display module 24. In this embodiment, the tracking device 2 may be a mobile phone, a PDA, or a computer such as a notebook computer or a desktop computer.

The input module 21 of the tracking device 2 is connected to the processing module 23 of the tracking device 2 and is operable so as to enable the tracking device 2 to issue a command that contains a device ID of the tracking device 2. In this embodiment, the device ID is a phone number of the tracking device 2.

The communications module 22 of the tracking device 2 is connected to the processing module 23 of the tracking device 2 and the GSM telecommunications network, and is operable so as to send out the command of the tracking device 2 to the target device 1 through the GSM telecommunications network. In this embodiment, the command is in the form of a text message, such as a SMS text message or a MMS text message.

In another embodiment, the command is in a form of a missed call. That is, the tracking device 2 first calls the target device 1 by dialing a phone number of the target device 1 using the input module 21 thereof, and then hangs up before the target device 1 receives the call.

In yet another embodiment, the command is in the form of a dual-tone multi-frequency signal. That is, the tracking device 2 first calls the target device 1 by dialing the phone number of the target device 1 using the input module 21 thereof, and then generates DTMF signals using also the input module 21 thereof after the target device 1 receives the call.

It is noted that the target device 1 sends the URL to the tracking device 2 only upon successful verification thereby of the device ID of the tracking device 2 contained in the command sent thereto by the tracking device 2.

In this embodiment, the tracking device 2 is operable so as to establish a connection with the Internet through a general packet radio service (GPRS) of the GSM telecommunications network via the communications module 22 thereof.

In another embodiment, the tracking device 2 further includes a networking module (not shown) connected to the processing module 23 thereof, and is operable so as to establish a connection with the Internet through a wireless internet service provider (not shown), such as a Wi-Fi-based or a WiMax-based wireless internet service provider, via the networking module thereof.

The display module 24 of the tracking device 2 is connected to the processing module 23 of the tracking device 2 and is operable so as to display thereon the URL sent by the target device 1.

It is noted that since the target device 1 generates the URL as a hyperlink, the display module 24 of the tracking device 2, likewise, displays the URL as a hyperlink.

The tracking device 2 is further operable so as to access the electronic map-containing webpage using the URL displayed on the display module 24 thereof. In this embodiment, the tracking device 2 accesses the electronic map-containing webpage through a communications protocol, such as a hypertext transfer protocol (HTTP).

It is noted that since the display module 24 of the tracking device 2 displays the URL as a hyperlink, the electronic map-containing webpage may be accessed by selecting the URL using the input module 21 of the tracking device 2 or by tapping the URL using a finger or a stylus in combination with a touch control interface, in a manner well known in the art.

The display module 24 of the tracking device 2 is further operable so as to display the electronic map-containing webpage accessed by the tracking device 2. In this embodiment, the electronic map-containing webpage contains an electronic map, and an indication of a location of the target device 1 on the electronic map.

The server 7 includes a processing module 72, a networking module 71, and a geographic information system (GIS) module 73. In this embodiment, the server 7 is a web server that hosts the website indicated in the URL generated by the target device 1.

The networking module 71 of the server 7 is connected to the processing module 72 of the server 7 and the Internet, and is operable so as to detect an access request to the electronic map-containing webpage by the tracking device 2.

The GIS module 73 of the server 7 is connected to the processing module 72 of the server 7 and includes a database that stores a plurality of electronic maps.

The server 7 creates the electronic map-containing webpage based on the location information contained in the URL when the networking module 71 thereof detects the access request to the electronic map-containing webpage by the tracking device 2. In this embodiment, the server 7 creates the electronic map-containing webpage first by retrieving the electronic map, which corresponds to the location information, from the database of the GIS module 73 thereof or a database of a GIS module of another server, and then by indicating the location of the target device 1 on the electronic map retrieved thereby with reference to the location information.

From the above description, the tracking device 2 of the tracking system of this embodiment, unlike the tracking device of the conventional tracking system, does not require a GIS module. As such, any mobile phone which has a capability to receive a text message, such as via the SMS of the GSM telecommunications network, and to establish a connection with the Internet, such as through the GPRS of the GSM telecommunications network, may be employed as a tracking device.

Figure 3A:
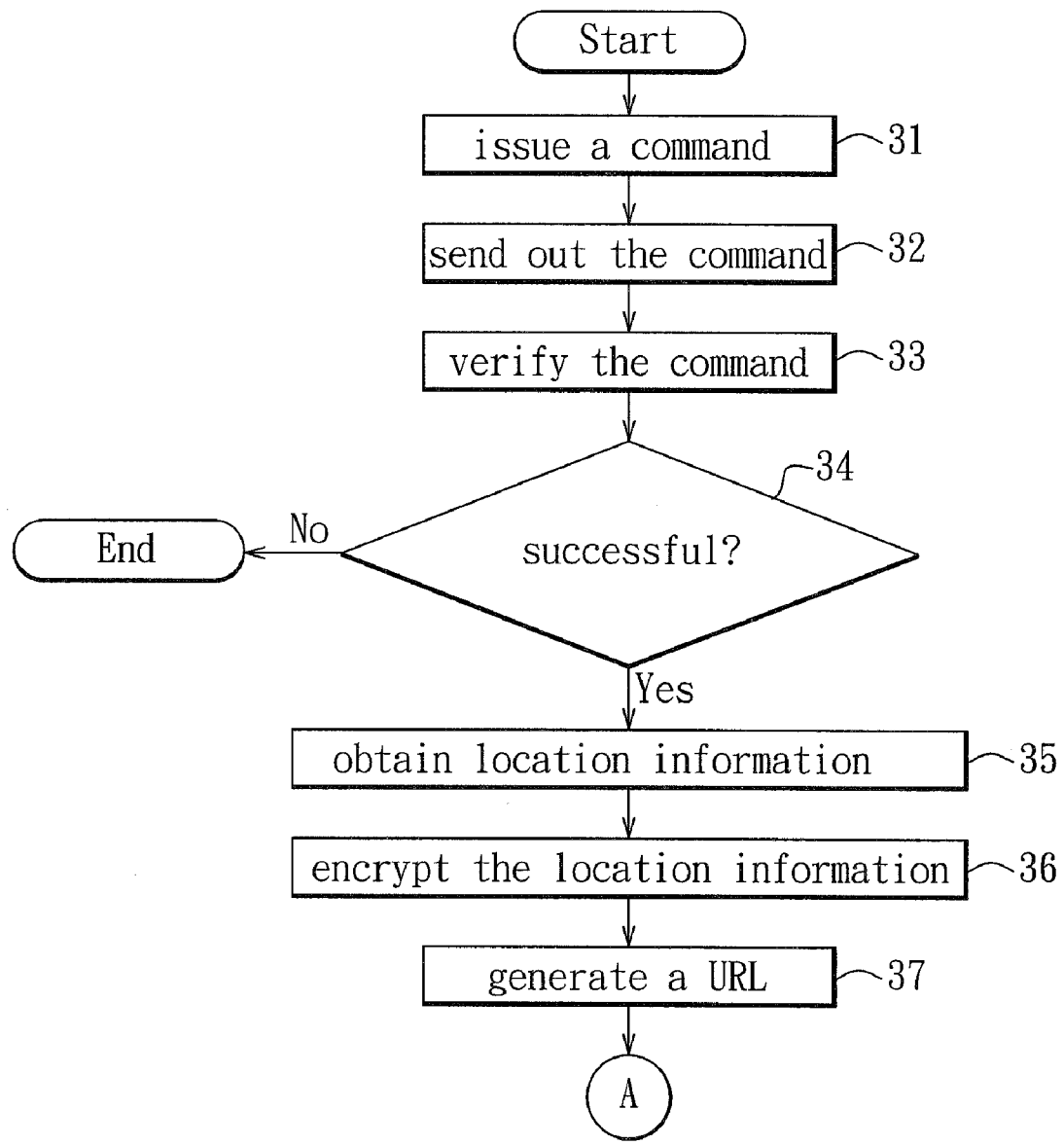
FIGS. 3A and 3B are flow charts of the first embodiment of a tracking method to be implemented using the tracking system shown in FIG. 1.
Figure 3B:
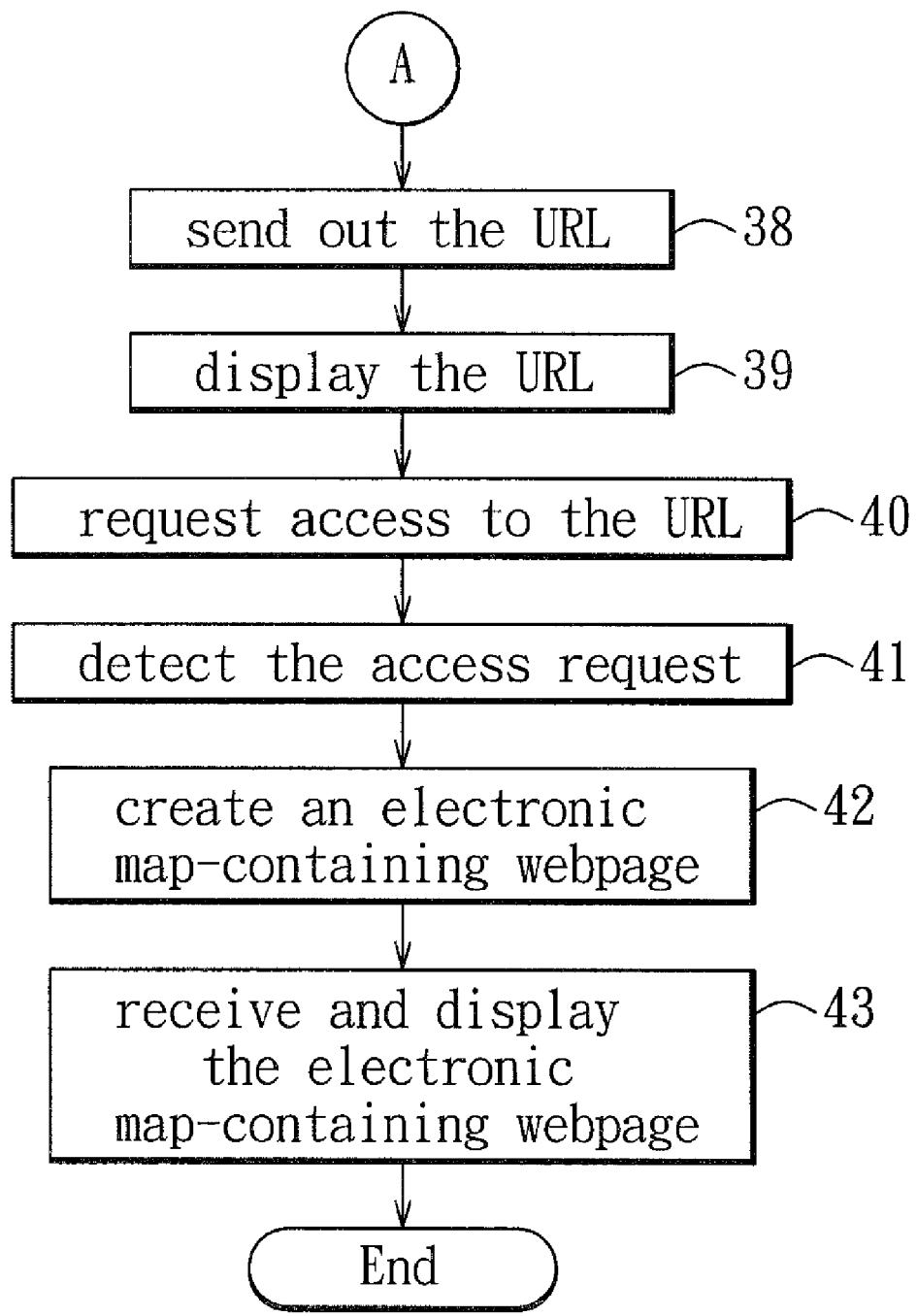

The first embodiment of a tracking method to be implemented using the aforementioned tracking system according to this invention will now be described with further reference to FIGS. 3A and 3B.

In step 31, the input module 21 of the tracking device 2 is operated to enable the tracking device 2 to issue the command, which contains the device ID of the tracking device 2.

In step 32, the communications module 22 of the tracking device 2 sends out the command issued in step 31 to the target device 1.

In step 33, the target device 1 verifies the device ID of the tracking device 2 contained in the command sent in step 32.

In this step, the target device 1 compares the device ID of the tracking device 2 with a phone number stored in the memory module 14 thereof.

In step 34, when the target device 1 successfully verifies the device ID of the tracking device 2 in step 33, i.e., the device ID of the tracking device 2 contained in the command sent thereto in step 32 and the phone number stored in the memory module 14 thereof are identical, the flow proceeds to step 35. Otherwise, the target device 1 simply ignores the command and the flow is terminated.

In step 35, the positioning module 11 of the target device 1 obtains location information of the target device 1.

In step 36, the target device 1 encrypts the location information obtained in step 35.

In step 37, the target device 1 generates a URL as a hyperlink that contains the location information encrypted in step 36 and the location of the electronic map-containing webpage of the website hosted by the server 7.

In step 38, the communications module 12 of the target device 1 sends out the URL generated in step 37 to the tracking device 2.

In step 39, the display module 24 of the tracking device 2 displays thereon the URL.

In step 40, the tracking device 2 requests access to the electronic map-containing webpage using the URL displayed in step 39.

In step 41, the networking module 71 of the server 7 detects the access request to the electronic map-containing webpage by the tracking device 2.

In step 42, the server 7 creates the electronic map-containing webpage.

In step 43, the tracking device 2 receives the electronic map-containing webpage created in step 42, and the display module 24 of the tracking device 2 displays thereon the electronic map-containing webpage.

In another embodiment, steps 33 and 34 are skipped.

In yet another embodiment, steps 31 to 34 are skipped and steps 35 to 38 are performed periodically.

Figure 4:
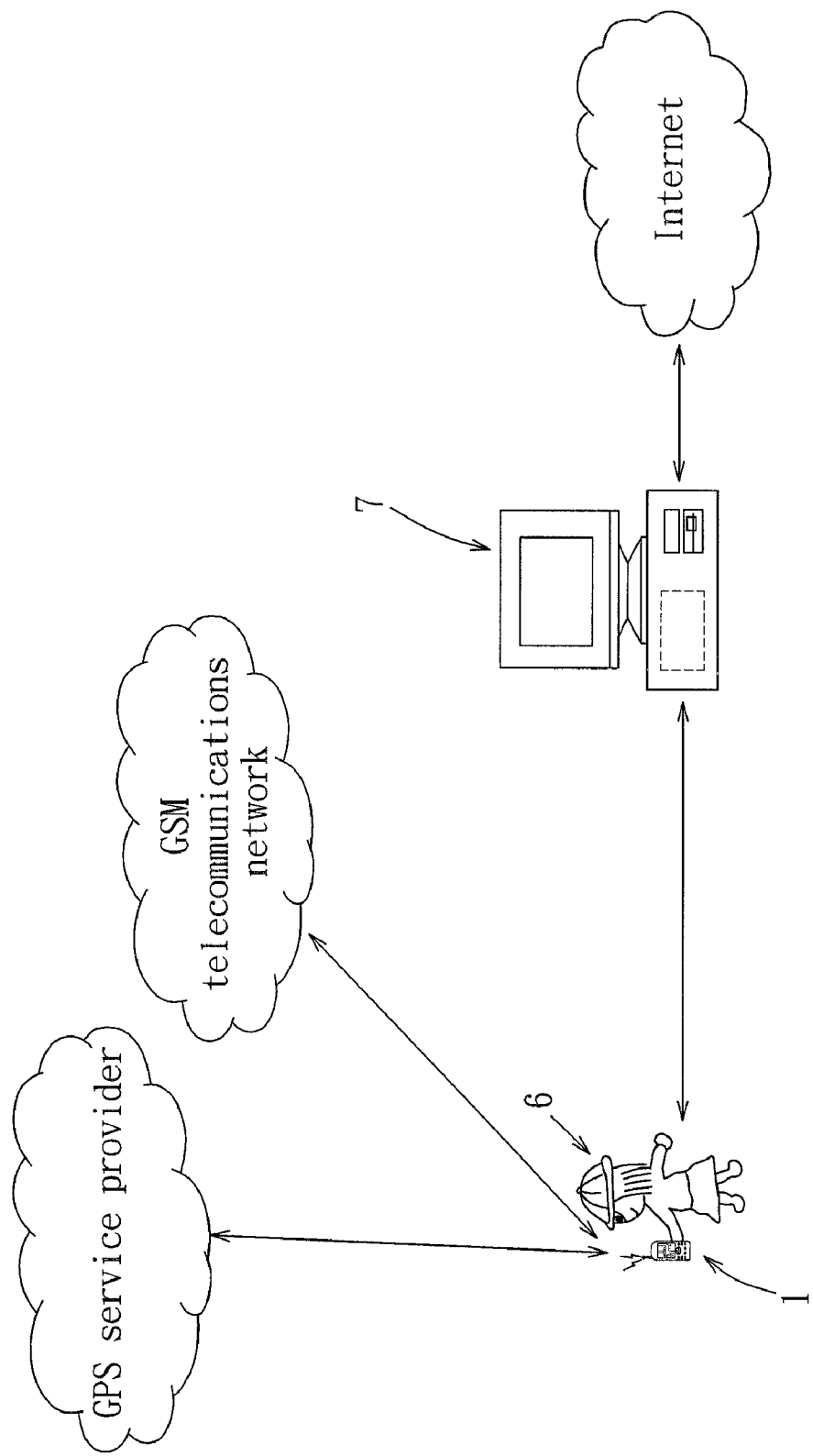
FIG. 4 is a schematic diagram of the second embodiment of a tracking system.
Figure 5:
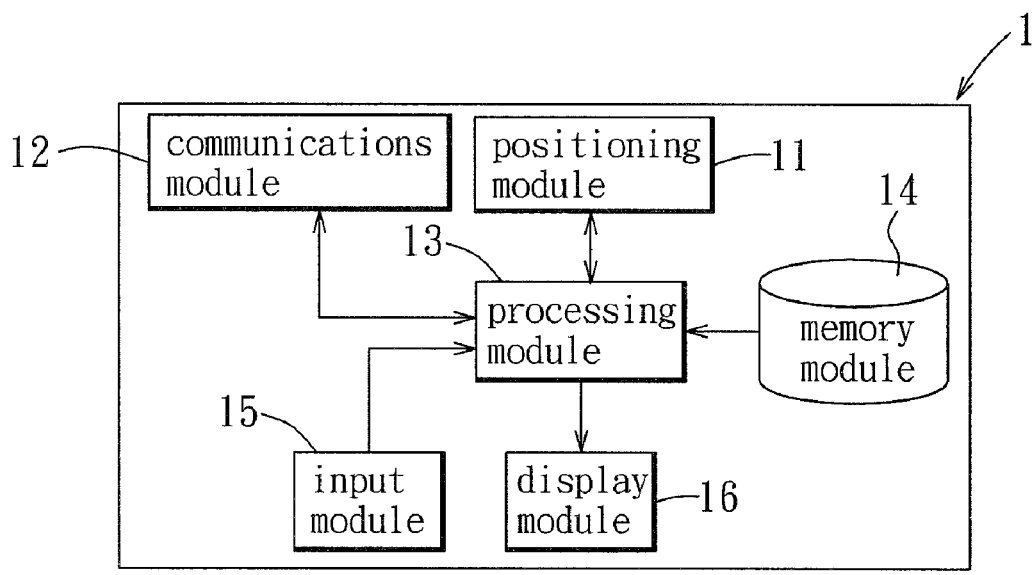
FIG. 5 is a block diagram of each of a target device and a server of the second embodiment.
Figure 5:
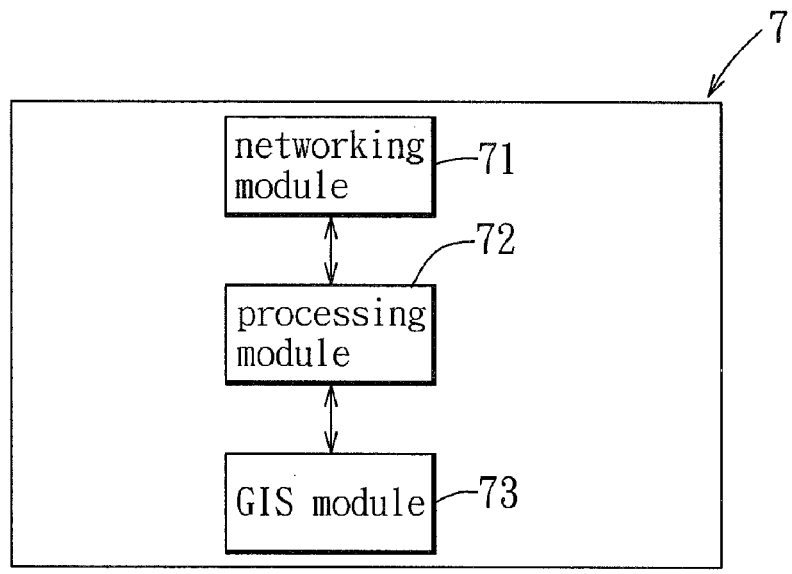

FIGS. 4 and 5 illustrate the second embodiment of a tracking system according to this invention. When compared to the previous embodiment, the tracking system of this embodiment permits a person 6 to track a location thereof, in a manner that will be described hereinafter.

In this embodiment, the tracking system includes a target device 1 and a server 7.

The target device 1 includes a processing module 13, an input module 15, a positioning module 11, a memory module 14, a communications module 12, and a display module 16. In this embodiment, the target device 1 is a portable electronic device, such as a mobile phone or a PDA.

The input module 15 of the target device 1 is connected to the processing module 13 of the target device 1 and is operable so as to enable the target device 1 to issue a location request.

The positioning module 11 of the target device 1 is connected to the processing module 13 of the target device 1, and is operable so as to send out the location request of the target device 1 to the GPS service provider and so as to subsequently obtain location information of the target device 1 from the GPS service provider. In this embodiment, the location information includes a latitude, a longitude, a speed, a direction, an orientation of the target device 1, and date and time at which the location information is obtained by the positioning module 11 of the target device 1.

The memory module 14 of the target device 1 is connected to the processing module 13 of the target device 1, and stores a program instruction which, when executed by the processing module 13 of the target device 1 causes the target device 1 to generate a URL that contains the location information of the target device 1 obtained by the positioning module 11 of the target device 1 and a location of an electronic map-containing webpage of a website. In this embodiment, the target device 1 generates the URL as a hyperlink. Moreover, in this embodiment, the target device 1 stores the URL generated thereby in the memory module 14 thereof as a text message.

The communications module 12 of the target device 1 is connected to the processing module 13 of the target device 1 and the GSM telecommunications network.

In this embodiment, the target device 1 is operable so as to establish a connection with the Internet through the GPRS of the GSM telecommunications network via the communications module 12 thereof.

In another embodiment, the target device 1 further includes a networking module (not shown) connected to the processing module 13 thereof, and is operable so as to establish a connection with the Internet through a wireless internet service provider (not shown) via the networking module thereof.

The display module 16 of the target device 1 is connected to the processing module 13 of the target device 1 and is operable so as to display thereon the URL stored in the memory module 14 of the target device 1.

It is noted that since the target device 1 generates the URL as a hyperlink, the display module 16 of the target device 1, likewise displays the URL as a hyperlink.

The target device 1 is further operable so as to access the electronic map-containing webpage using the URL displayed on the display module 16 thereof. In this embodiment, the target device 1 accesses the electronic map-containing webpage through a communications protocol, such as the HTTP.

It is noted that since the display module 16 of the target device 1 displays the URL as a hyperlink, the electronic map-containing webpage may be accessed by selecting the URL using the input module 15 of the target device 1 or by tapping the URL using a finger or a stylus in combination with a touch control interface, in a manner well known in the art.

The display module 16 of the target device 1 is further operable so as to display the electronic map-containing webpage accessed by the target device 1. In this embodiment, the electronic map-containing webpage contains an electronic map, and an indication of a location of the target device 1 on the electronic map.

The server 7 includes a processing module 72, a networking module 71, and a geographic information system (GIS) module 73. In this embodiment, the server 7 is a web server 7 that hosts the website indicated in the URL generated by the target device 1.

The networking module 71 of the server 7 is connected to the processing module 72 of the server 7 and the Internet, and is operable so as to detect an access request to the electronic map-containing webpage by the target device 1.

The GIS module 73 of the server 7 is connected to the processing module 72 of the server 7, and includes a database that stores a plurality of electronic maps.

The server 7 creates the electronic map-containing webpage based on the location information contained in the URL when the networking module 71 thereof detects the access request to the electronic map-containing webpage by the target device 1. In this embodiment, the server 7 creates the electronic map-containing webpage first by retrieving the electronic map, which corresponds to the location information, from the database of the GIS module 73 thereof or a database of a GIS module of another server, and then by indicating the location of the target device 1 on the electronic map retrieved thereby with reference to the location information.

From the above description, since the target device 1 of the tracking system of this embodiment does not require a GIS module, any mobile phone which has a capability to obtain a location information thereof, such as from the GPS service provider, and to establish a connection with the Internet, such as through the GPRS of the GSM telecommunications network, may be employed as a target device 1.

Figure 6:
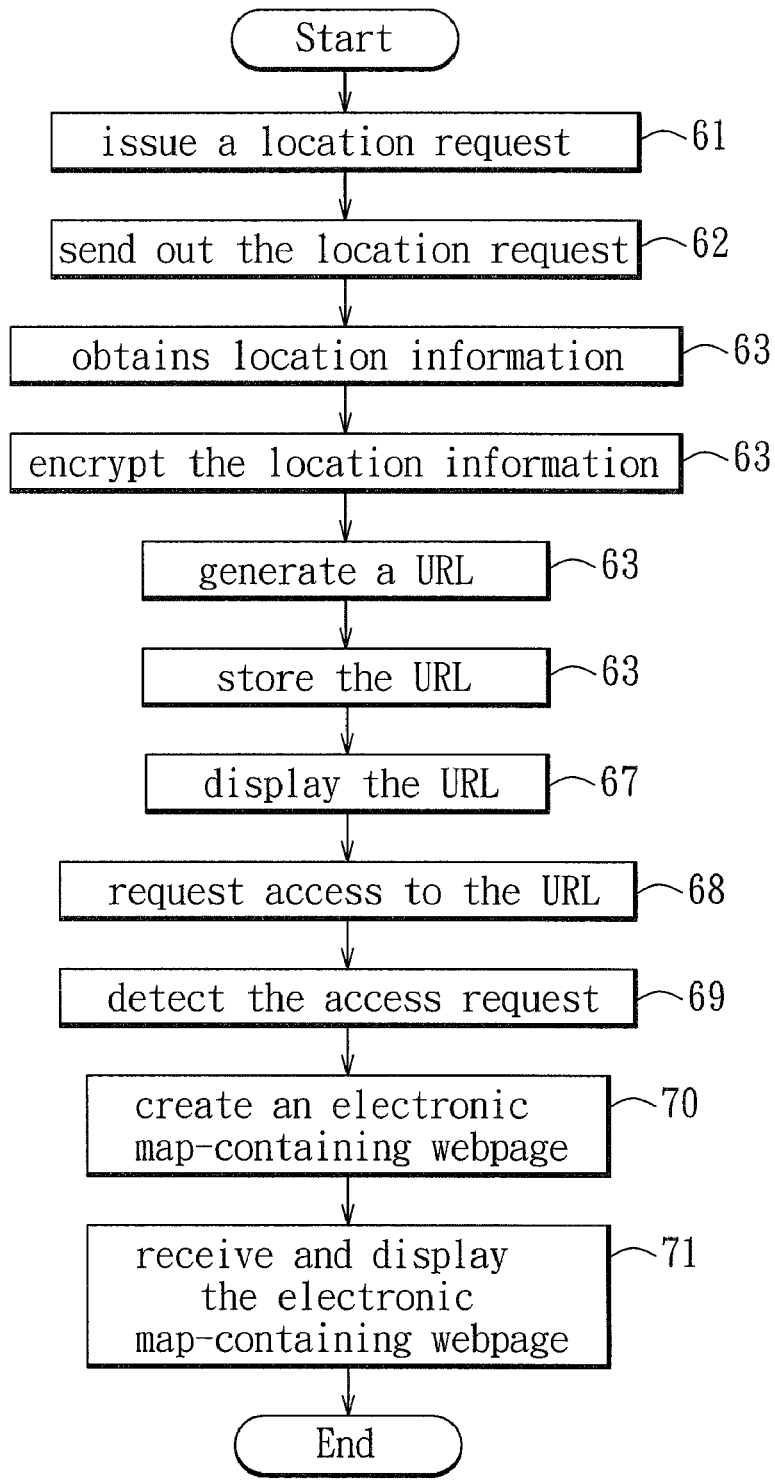
FIG. 6 is a flow chart of the second embodiment of a tracking method to be implemented using the tracking system shown in FIG. 4.

The second embodiment of a tracking method to be implemented using the aforementioned tracking system according to this invention will now be described with further reference to FIG. 6.

In step 61, the input module 15 of the target device 1 is operated to enable the target device 1 to issue the location request.

In step 62, the positioning module 11 of the target device 1 sends out the location request issued in step 61 to the GPS service provider.

In step 63, the positioning module 11 of the target device 1 obtains location information of the target device 1.

In step 64, the target device 1 encrypts the location information obtained in step 63.

In step 65, the target device 1 generates a URL as a hyperlink that contains the location information encrypted in step 64 and the location of the electronic map-containing webpage of the website hosted by the server 7.

In step 66, the target device 1 stores the URL generated thereby as a text message in the memory module 14 thereof.

In step 67, the display module 16 of the target device 1 displays thereon the URL stored in step 66.

In step 68, the target device 1 requests access to the electronic map-containing webpage using the URL displayed in step 67.

In step 69, the networking module 71 of the server 7 detects the access request to the electronic map-containing webpage by the target device 1.

In step 70, the server 7 creates the electronic map-containing webpage.

In step 71, the target device 1 receives the electronic map-containing webpage created in step 70, and the display module 16 of the target device 1 displays thereon the electronic map-containing webpage.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A tracking method, comprising:
   A) enabling a target device to obtain a location information thereof;
   B) enabling the target device to generate a uniform resource locator (URL), which contains the location information obtained thereby in step A) and a location of an electronic map-containing webpage of a website;
   C) enabling the target device to send the URL generated thereby in step B) to a tracking device; and
   D) enabling the tracking device to access the electronic map-containing webpage using the URL sent by the target device in step C), the electronic map-containing webpage containing an electronic map, and an indication of a location of the target device on the electronic map.

2. The tracking method as claimed in claim 1, wherein, in step C), the target device sends the URL to the tracking device via one of a short messaging service (SMS), a multimedia messaging service (MMS), and an electronic mail (e-mail).

3. The tracking method as claimed in claim 1, wherein, in step C), the target device sends the URL to the tracking device through a global system for mobile communications (GSM) telecommunication network.

4. The tracking method as claimed in claim 1, wherein the website is hosted by a server, and step D) further includes the sub-steps of:
   d1) enabling the tracking device to access the electronic map-containing webpage using the URL; and
   d2) enabling the server to create the electronic map-containing webpage based on the location information contained in the URL.

5. The tracking method as claimed in claim 4, wherein the server retrieves the electronic map from one of a database thereof and a database of another server.

6. The tracking method as claimed in claim 1, further comprising:
   E) enabling the tracking device to issue a command to the target device prior to step A).

7. The tracking method as claimed in claim 6, wherein, in step E), the command is in the form of one of a missed call, a text message, and a dual-tone multi-frequency signal.

8. The tracking method as claimed in claim 6, wherein, in step E), the command contains a device identification (ID) of the tracking device, and in step A), the target device is enabled to verify the device ID of the tracking device such that the target device obtains the location information thereof only upon successful verification of the device ID of the tracking device.

9. The tracking method as claimed in claim 8, wherein the device ID of the tracking device is a phone number of the tracking device.

* * * * *